United States Patent
Fuss et al.

(10) Patent No.: US 6,401,119 B1
(45) Date of Patent: Jun. 4, 2002

(54) METHOD AND SYSTEM FOR MONITORING AND MANAGING NETWORK CONDITION

(75) Inventors: Albert Fuss, Munich; Thomas Kloeber, Puschendorf, both of (DE)

(73) Assignee: ICS Intellegent Communication Software GmbH, Munich (DE)

(*) Notice: Subject to any disclaimer, the term of this patent is extended or adjusted under 35 U.S.C. 154(b) by 0 days.

(21) Appl. No.: 09/156,977

(22) Filed: Sep. 18, 1998

(51) Int. Cl.$^7$ ................................ G06F 11/30
(52) U.S. Cl. ........................ 709/224; 714/47
(58) Field of Search ................... 709/224, 223, 709/220; 714/47, 49, 48; 703/22

(56) References Cited

U.S. PATENT DOCUMENTS

| | | | |
|---|---|---|---|
| 5,261,044 A | | 11/1993 | Dev et al. ............... 395/159 |
| 5,295,244 A | | 3/1994 | Dev et al. ............... 395/161 |
| 5,471,399 A | | 11/1995 | Tanaka et al. ........... 364/491 |
| 5,548,506 A | * | 8/1996 | Srinivasan ............. 364/401 R |
| 5,696,486 A | * | 12/1997 | Poliquin et al. ......... 340/506 |
| 5,740,357 A | * | 4/1998 | Cardiner et al. ...... 395/185.01 |
| 5,768,524 A | * | 6/1998 | Schmidt ................... 709/224 |
| 5,777,549 A | * | 7/1998 | Arrowsmith et al. ..... 340/506 |
| 5,819,028 A | * | 10/1998 | Manghirmalani et al. ............. 395/185.1 |
| 5,933,601 A | * | 8/1999 | Fanshier et al. ......... 709/223 |
| 5,958,012 A | * | 9/1999 | Battat et al. ............. 709/224 |
| 5,999,724 A | * | 12/1999 | Iwasa et al. ............. 703/22 |
| 6,000,045 A | * | 12/1999 | Lewis ...................... 714/47 |
| 6,006,016 A | * | 12/1999 | Faigon et al. ......... 395/185.01 |
| 6,128,016 A | * | 10/2000 | Coelho et al. ........... 345/347 |
| 6,226,760 B1 | * | 5/2001 | Burkhardt et al. ....... 714/33 |
| 6,237,034 B1 | * | 5/2001 | Fulford .................... 709/224 |

FOREIGN PATENT DOCUMENTS

| | | |
|---|---|---|
| DE | 196 09 889 | 9/1997 |
| EP | 0 503 921 A2 | 9/1992 |
| EP | 0 614 151 A1 | 9/1994 |
| JP | 0950971 A2 * 4/1999 | ........... G06F/17/60 |

OTHER PUBLICATIONS

*International Search Report* concerning International Application Ser. No. EP 97 10 4076, European Patent Office, dated Jun. 22, 1999, 3 pgs.

* cited by examiner

*Primary Examiner*—Robert B. Harrell
*Assistant Examiner*—Bunjob Jaroenchonwanit
(74) *Attorney, Agent, or Firm*—Marshall, Gerstein, & Borun

(57) ABSTRACT

A network management system for use with a computer network is disclosed. The network management system includes a status detector for detecting an event effecting a condition of a first network element. It also includes a control unit for determining whether a condition of a second network element associated with the first network element is effected by the detected event. The network management system visually represents the status of the network on client computers of the network to promote efficient planning and workflow.

39 Claims, 5 Drawing Sheets

METHOD AND SYSTEM FOR MONITORING AND MANAGING NETWORK CONDITION

FIELD OF THE INVENTION

The invention relates generally to computer networks, and, more particularly, to a network management system for detecting system events such as disturbances and overloads and for visually displaying the status of the monitored network.

BACKGROUND OF THE INVENTION

A prior art computer network is known from U.S. Pat. No. 5,295,244 (or U.S. Pat. No. 5,261,044). Such prior art client-server networks include a network management system which makes it possible for the network user to display each component of the network on a screen as an icon representative of the corresponding component. The icon images may represent network components at different locations or in different departments of a company. The different icon images are always built up hierarchically. In other words, by clicking on a displayed icon representative of a network component, the user can bring up the image of the network components in the underlying level. Moreover, the network management systems of the known client-server networks are also able to identify and locate the errors that occur in the corresponding network. An error isolation technique is typically used to this end. Specifically, if an error occurs in any component of the network, an investigation is initiated to determine if the error is caused in the component itself or in the immediately neighboring components. Once the error is localized in the network, prior art network management systems break off all further analysis, for example, regarding the effects of this error on the network as a whole.

Another prior art network management system for a computer network is known from U.S. Pat. No. 5,471,399. As with the system described above, a number of components of the network, (selected according to a predetermined algorithm), are displayed on a screen of the network management system as icon images representative of the corresponding components. By clicking on an icon image, the underlying components of the network immediately associated with the corresponding image are recalled and represented in a new screen window. When an error occurs in one of the represented network components, the color of the represented image is changed, so that the network user can easily identify the existence of the system error. However, like the other systems described above, this management system fails to provide analysis of the effect or consequences of the system error on other network components.

Known prior art networks have the disadvantage that the error information they provide is typically highly technical in nature. Since only very few users are familiar with the technical details and individual parts of a network, technical information such as "the router between the ethernet partial network at location B of the company and the backbone of the network at location B are overloaded", provides limited information to most users. Even persons who are technically well-versed need a lengthy study of the system description in order to determine from such technical error information which parts of the company are actually affected by the disturbance that occurred.

The earlier common mainframe computer systems, (i.e., those which are based essentially on one central computer which controls the entire data processing system), have been replaced more and more by heterogeneous client-server applications. As a result, the control of the network by a central computer is no longer possible because such a central computer does not even exist. Rather, modem data processing systems have a network of independent partial or sub-networks which communicate with one another through connecting elements, such as bridges or routers in the simplest case. This technological change renders central control of system failures or overloads according to the methods of the mainframe computer impossible.

Although individual items of information regarding the network properties can also be exchanged through the client-server network, the influence of these disturbances on the operational progress of the entire network cannot be derived from this exchange. However, in order to be able to react as quickly as possible to system disturbances or overloads, it is exactly this information (i.e., the influence of disturbances on the network as a whole) that has been very desirable since the introduction of client-server applications, which convert the operational organization into individual models which are then imaged in the network.

SUMMARY OF THE INVENTION

In accordance with an aspect of the invention a network management system for use with a computer network having a hierarchical structure is provided. The network includes a server, a first client computer, and a second client computer. The network management system includes a status detector for detecting an event effecting a condition of a first network element on the network. It also includes a control unit cooperating with the status detector for determining whether a condition of a second network element associated with the first network element within the hierarchical structure is effected by the detected event. Additionally, the network management system is provided with a graphics driver cooperating with the status detector and the control unit to visually represent the status of at least a portion of the network on the first and second client computers. The status includes the conditions of the first and second network elements as determined by the status detector and the control unit.

Preferably, the detected event comprises a disturbance and/or a system property.

In some embodiments, the control unit and the status detector identify limitations in the performing ability of the first and second network elements and cooperate with the graphics driver to visually represent a status of the network which visually characterizes the conditions of the first and second network elements with regard to the identified limitations.

In some embodiments, the control unit and/or the status detector determines a processing status of a software application on the network, and cooperates with the graphics driver to visually represent a status of the network which visually characterizes the network components with regard to the processing status of the software application.

The network management system may optionally be associated with a first sub-network. In such embodiments, a second network management system associated with a second sub-network for determining a status of the second sub-network is preferably provided. In such embodiments, the network management systems of the first and second sub-networks exchange status information to determine the network status for the network. In some such embodiments, the first and second sub-networks are connected to one another by at least two routers, by at least two bridges, and/or by a backbone. In some embodiments of the foregoing types, the network management systems of the first and second sub-networks communicate with one another through telephone lines.

Optionally, the network management system is responsive to a detected event indicative of a blocked or overloaded communication channel to change the system address of the first client computer such that the overloaded or blocked communication channel is avoided by communications with the first client computer.

In some embodiments, the graphics driver visually represents the conditions of the first and second network elements on a monitor connected to the server.

In some embodiments, the network management system is additionally provided with an output device cooperating with the graphics driver to transmit the visual representation of the status of the network to substantially all display devices of the network.

The visual representation of the status of the network may optionally comprise a status line blended in the edge region of a desktop display, and/or the visual representation of the status of the network may optionally comprise a miniaturized representation of the network hierarchy, with any overloaded, disturbed and trouble-free areas of the network hierarchy being distinguished from one another with the aid of color coding.

In some embodiments, the visual representation of the status of the network includes visual representations of client computers and network components in a first sub-network, and further includes visual representations of connections to a sub-network neighboring the first sub-network. In such embodiments, the network management system is responsive to an input to visually represent the status of the neighboring sub-network.

Optionally, the visual representation of the status of the network may include weighting of the disturbances and bottlenecks detected by the control unit according to their effect on the operation of the network. When such an option is implemented, the control unit periodically delivers a disturbance survey comprising a list of disturbances sorted by weight to at least one of the users of the network.

In some embodiments, if the detected event prevents delivery of data to an address on the network, the network management system stores the data for later delivery. In such embodiments, the network management system preferably automatically sends the stored data to the originally intended address when the delivery impediment has been removed.

In some embodiments, if the detected event comprises a disturbance of a first network element, the network management system isolates an area of the network associated with the first network element from the remainder of the network and includes the isolation in the visual representation of the status of the network.

In accordance with another aspect of the invention, a method for use with a computer network having a hierarchical structure is provided. The method comprises the steps of: detecting an event effecting a condition of a first network element on the network; determining whether a condition of a second network element associated with the first network element within the hierarchical structure is effected by the detected event; and visually representing the status of at least a portion of the network on the first and second client computers, the status including the conditions of the first and second network elements.

In some embodiments, the method further comprises the steps of: responsive to a disturbance, determining system conditions for each network element in a predefined area of the network; comparing the determined system conditions with the operational organizational structure of the network to identify the effects of the determined system conditions on individual operational processes associated with the operational organizational structure; and visually displaying the effects of the determined system conditions on individual areas of the network hierarchy associated with the operational processes. Some such embodiments, further comprise the step of displaying the operational organizational structure of the network.

Other features and advantages are inherent in the apparatus claimed and disclosed or will become apparent to those skilled in the art from the following detailed description and its accompanying drawings.

DESCRIPTION OF THE PREFERRED EMBODIMENT

Figure 1:
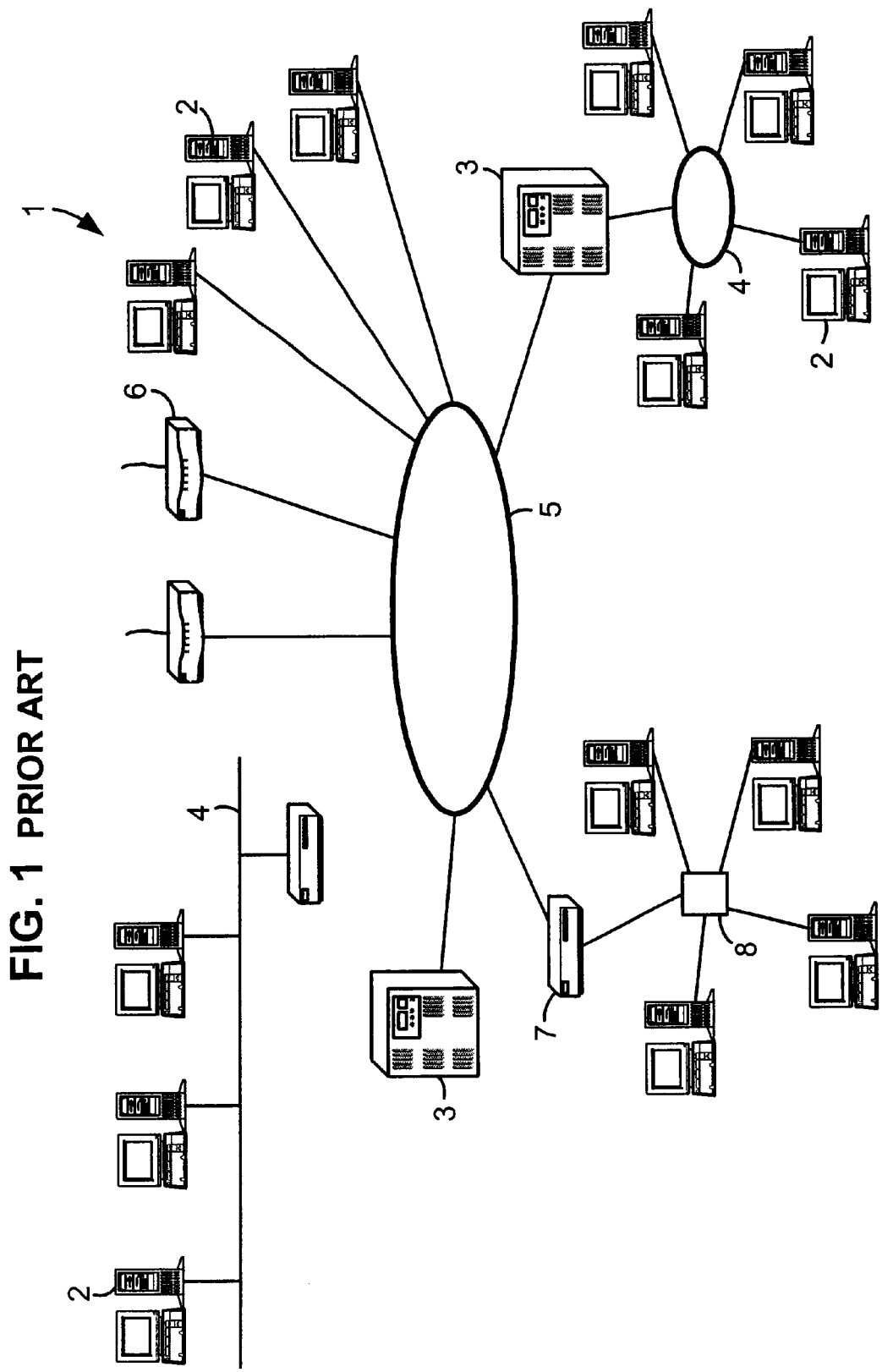
FIG. 1 is a schematic illustration of a representative computer network which is capable of employing a network management system constructed in accordance with the teachings of the instant invention.

FIG. 1 illustrates a computer network 1 (also called a client-server network) which is suitable for use with the invention. The network 1 has a central network connection or backbone 5 onto which various partial or sub-networks, and other network components 4 are connected. The partial network can be implemented by one or more star networks, ring networks or bus networks. A star network is preferably coupled through a star coupler 8.

Other connecting elements, for example a router 6 or a bridge 7, can be used to connect the network to neighboring networks. These can be directly neighboring computer networks, but can also be telephone networks connected through additional communication servers, through which access can be gained to other networks owned by the company or others.

If the illustrated network 1 is operated according to one of the known methods and an error or a bottleneck occurs in one of the network components 4 or in one of the servers 3 or client computers 2, then the users or the application software will only notice the problem when an access attempt fails. When such a failure occurs, the user reacts correspondingly and makes further attempts until the disturbance is eliminated, typically by a responsible coworker such as a network administrator. In very large heterogeneous networks, this approach is ineffective because, first of all, instead of delaying the efforts of only the affected network participants, the corrective actions of the responsible coworker or his/her software will, perhaps unnecessarily, postpone the entire project. This result occurs because the participant does not know the reason why the processing attempt failed and the system caretaker, on the other hand, is typically overwhelmed continuously with error messages without knowing what effects the individual errors will have on the operational process in detail. Thus, reported errors are usually eliminated in their order of receipt. In an extreme example of the deficiencies of this approach, a minor problem such as a broken BNC cable at the PC of a temporary secretary will be addressed before a major problem such as a failure of a hard disk drive that blocks communication between management and production.

With a network management system constructed in accordance with the teachings of the invention, the system caretaker, as well as each individual coworker has an instrument with which he/she can determine on his/her screen the effects of any error of the hardware and software network components directly, and can take appropriate measures. A network designed in this way, thus, contributes essentially to the effective maintenance of the data processing system.

Finally, with the aid of the graphic representation of the processing possibilities of the individual projects, each responsible person can plan exactly as to which existing processes can probably be processed as planned, and which processes will have to be postponed, based on the system limitations. This enhanced system knowledge makes it possible for such persons to include the system limitations directly in project planning and to avoid incorrect planning based on incorrect or unavailable information concerning network hardware status.

Figure 2:
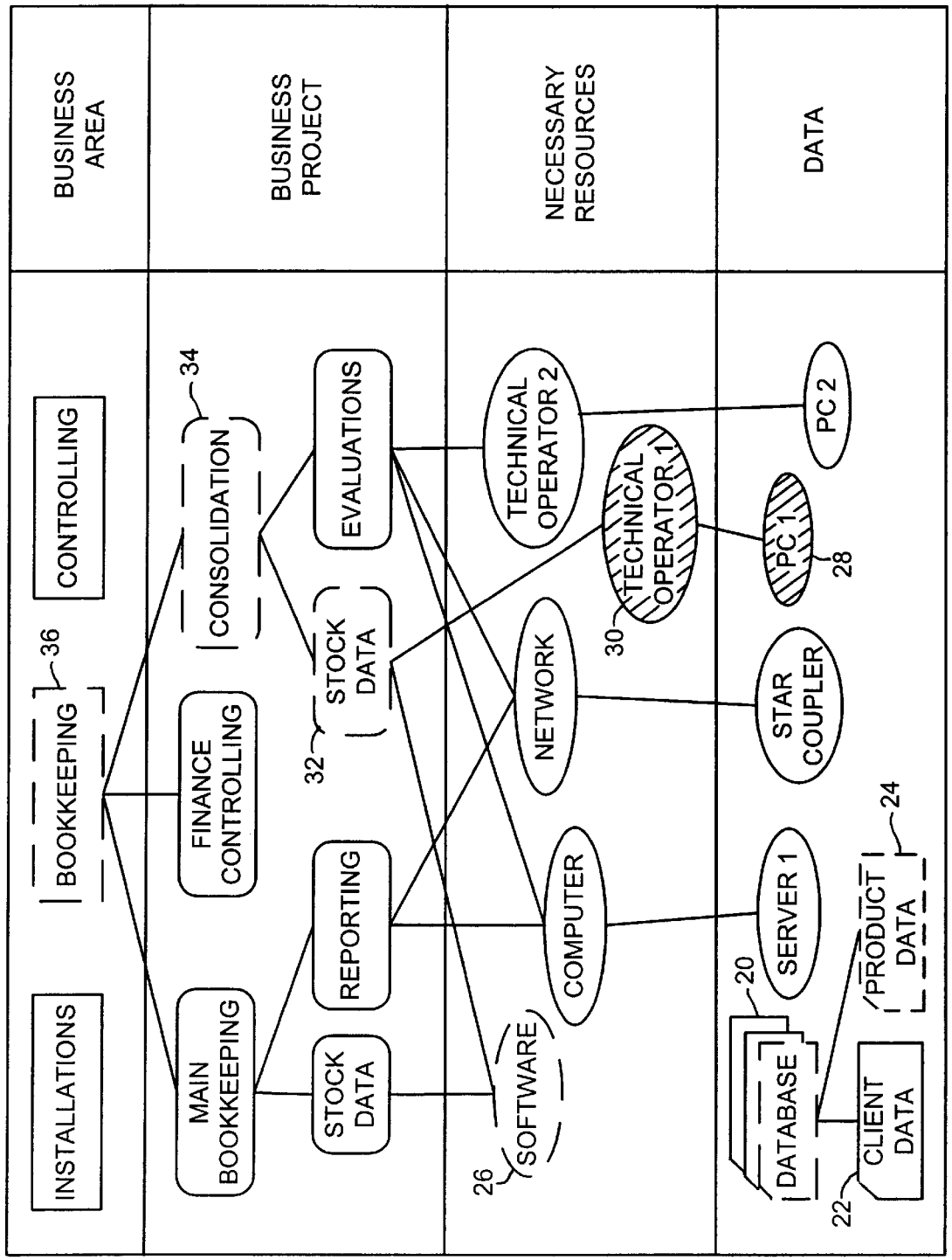
FIG. 2 is a schematic illustration of an example visual representation generated by a network management system operating in accordance with the teachings of the invention.

FIG. 2 illustrates a model of a business project in a particular business area and represents the IP (Information Processing) resources and data necessary for running the project on the network 1. Thus, for example, technical operator or worker 1 needs a personal computer (i.e., PC 1) for the project in bookkeeping and also needs the master data made available in a database 20 which manages the client and product data 22, 24.

If a bottleneck occurs in the case of the product data 24 because, for example, too many participants want to use this data simultaneously, then the data 24 will be difficult to access for the PC 1 of technical operator 1 and effective work is no longer possible because of the delay. The disclosed network management system recognizes this problem and assigns a corresponding problem status to the product database 24, which is displayed correspondingly on the screen of the PC 1, for example, by having the corresponding icon in the representation of the network 1 appear in orange color. FIG. 2 shows this problem status by a dotted icon 24. Due to the hierarchically managed network structure, this disturbance will influence the superimposed database 20 which, in turn, is no longer able to obtain and pass on the required data 24.

However, since the database 20 operates under limitations only with regard to product data 24, and the client data 22 can be transferred without limitation to, for example, the marketing department, the network management system assigns only a minor problem status to the database 20 (i.e., the database 20 is still fully functioning for some applications). This minor problem status can appear, for example, on the screen as a yellow coloration. In FIG. 2, this coloration is indicated by a dashed icon 20.

Similarly to the database 20, a bottleneck in the case of product data 24 can also have an influence on the software components 26 which perform the database inquiries. This potential problem is detected and the corresponding icon 26 is assigned a minor problem status (dashed icon).

Now, each user sees, for example, a yellow database symbol 20 on his/her screen, which indicates to him/her that he/she cannot expect the project to run entirely smoothly. The yellow icons 20, 26 also indicate that the database 20 has not failed, so that carrying out the project is entirely possible. To explore the possibility of proceeding, further information must be requested through subordinate network structures.

On the other hand, if all the network components necessary for a project are free from error (i.e., represented on the screen by, for example, green colored icons of network 1), the technical worker or a supervisor can assume that the hardware will not present any hindrance to carrying out the project, at least at the beginning of the project. Such an identification of possible problems may also occur during the running of the project.

In a second example from FIG. 2, the PC 1 of the technical worker 1 has failed. It, therefore, receives the highest ranking problem status from the network management system, namely failure. This can be indicated on the screen, for example, by red coloration of the corresponding symbol. In FIG. 2, this failure is shown by a blackened icon 28. Since, from the point of view of data processing, the technical worker 1 can work on the project only when he/she has a functioning PC, the failure of the PC 1 indicates that the technical worker 1 can no longer be involved in the project work, so that he is also marked as failed (see icon 30 in FIG. 2). Thus, none of the projects which require technical worker 1 can be performed during the duration of the failure of PC 1. This limitation of the IP resources corresponding to bookkeeping, can be recognized on the screen of network 1 by the fact that the master data processing icon 32 for stock data has a "strong disturbance" problem status, for example, indicated by orange coloration (dotted lines in FIG. 2). Furthermore, the consolidation 34 of bookkeeping as a superimposed business function as well as bookkeeping 36 itself show a minor problem status possibly marked by yellow coloration as explained above.

In a preferred embodiment of the invention, for example, those workers who do not belong to bookkeeping, for example, see only the yellow symbol 36 of bookkeeping on their screen. If projects are planned which involve bookkeeping, then the corresponding user of the network can request further information about the indicated low-grade disturbance, for example, by a mouse click on the bookkeeping symbol 36 or by some other input, provided that he/she has been authorized to receive such information by the system administrator. If he/she is so authorized, he/she will be shown the business projects of bookkeeping and, by entering his data, he/she can look at the graphical representation of bookkeeping being displayed (FIG. 2) where he/she will quickly see that the function location of the worker 1 is failed. Now, if he/she is planning a project which would involve the technical worker 1, he/she can postpone this project or take other corrective action. As a result, he/she can see that he/she cannot finish the project before the project even starts.

As shown in FIG. 1, the computer network 1 includes at least one central computer (server) 3, which is connected to at least two data processing end units (clients) 2 (possibly through network components). The computer network 1 is built up hierarchically (corresponding to the company hierarchy and the corresponding business processes). The server 3 is provided with software comprising at least one network management system 38 which includes a status detector 40 to determine certain local system properties including system disturbances in the computer network 1 and to provide visual display of the corresponding local state of the network 1 on one or several end devices 2. The network management system 38 has at least one control unit 42 which is adapted to determine the effects of the determined local system properties on other areas of the network hierarchy and to visually represent the status of the affected areas of the network 1 on the display units of the end equipment 2.

Figure 3:
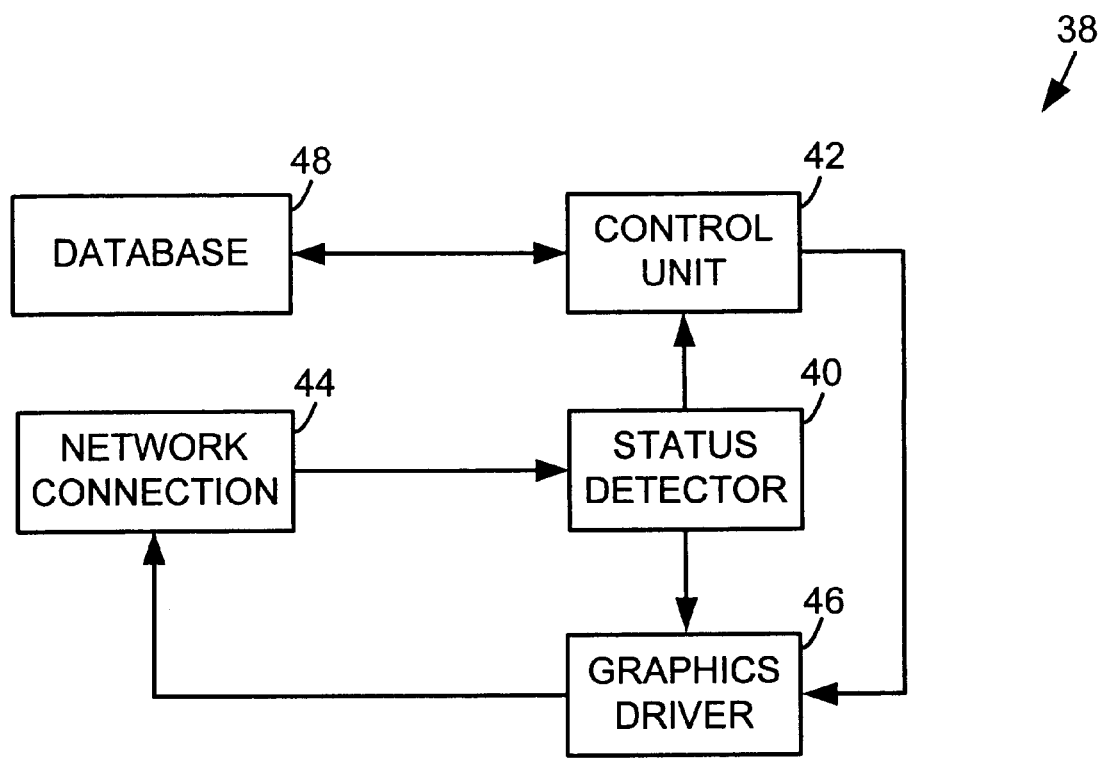
FIG. 3 is a schematic representation of a network management system constructed in accordance with the teachings of the invention.

In operation, certain local system properties, such as system disturbances in the computer network 1 are detected by the status detector 40 via a network connection 44 to the network 1 (see FIG. 3). The corresponding local network status detected by the status detector 40 is represented visually by a graphics driver 46 via the network connection 44. In addition, if a disturbance in the network 1 is detected by the status detector 40, the control unit 42 is alerted. The control unit 42 cooperates with a database 48 containing the business model to determine the effects of the found local system properties on other areas of the network hierarchy. The control unit 42 cooperates with the graphics driver 46 to visually represent the network status of the affected areas. Preferably, in addition to the status of the hardware components of the network 1, the detected system or network properties (e.g., system errors, instantaneous utilization and/or the free system resources, the state of installed software components, the state of processing of software applications running on the network, etc.) are also included in the visual status display.

Persons of ordinary skill in the art will appreciate that some or all of the network management system 38 shown in FIG. 3 can be implemented as hardware circuits or by software without departing from the scope or the spirit of the invention. Nonetheless, in the preferred embodiment, the network management system 38 is primarily implemented by software. A flow chart representation of one possible implementation of that software is shown in FIGS. 4A–4B.

Figure 4A:
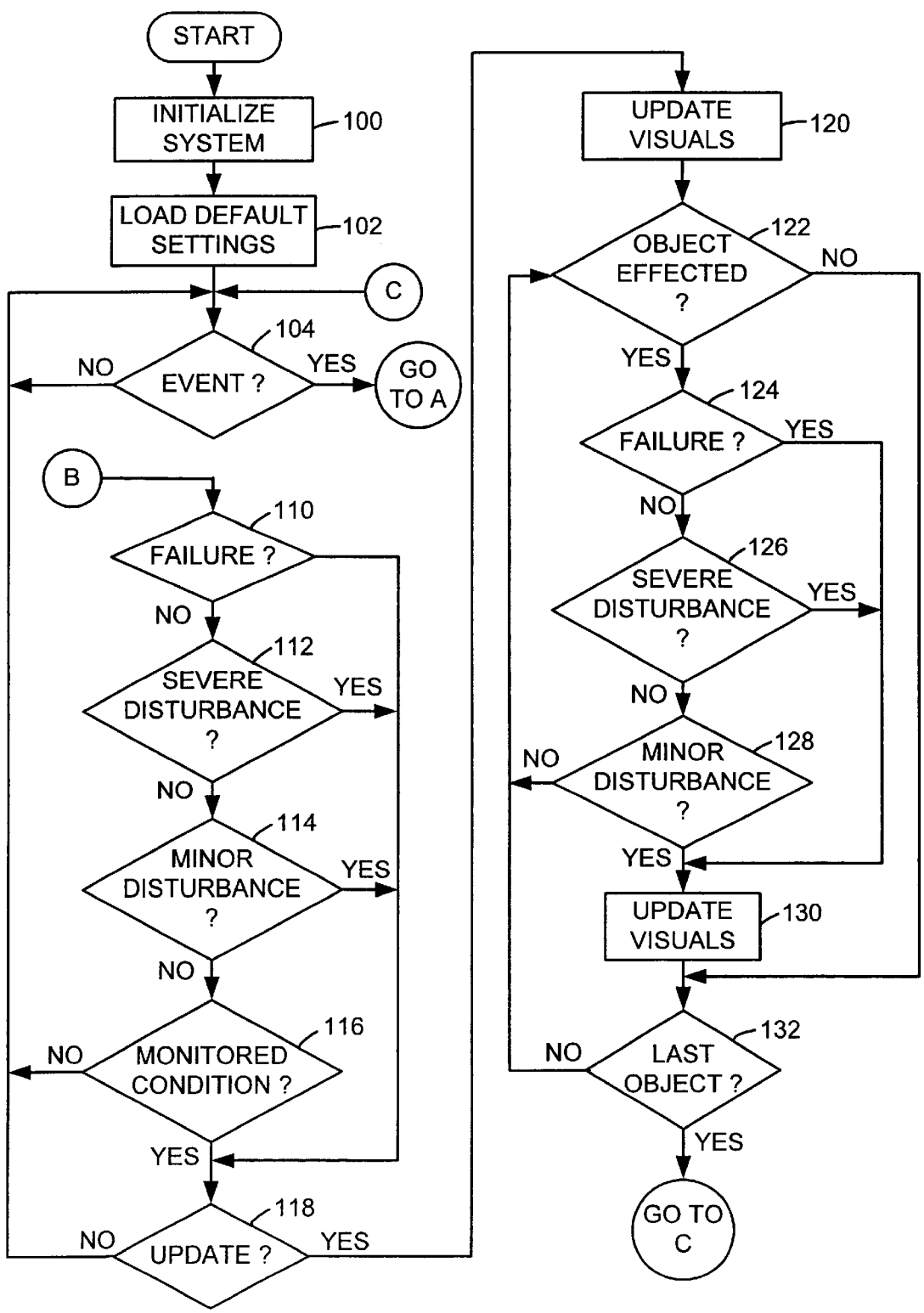
FIGS. 4A–4B are flow charts illustrating representative steps performed by a network management system operating pursuant to the teachings of the invention.
Figure 4B:
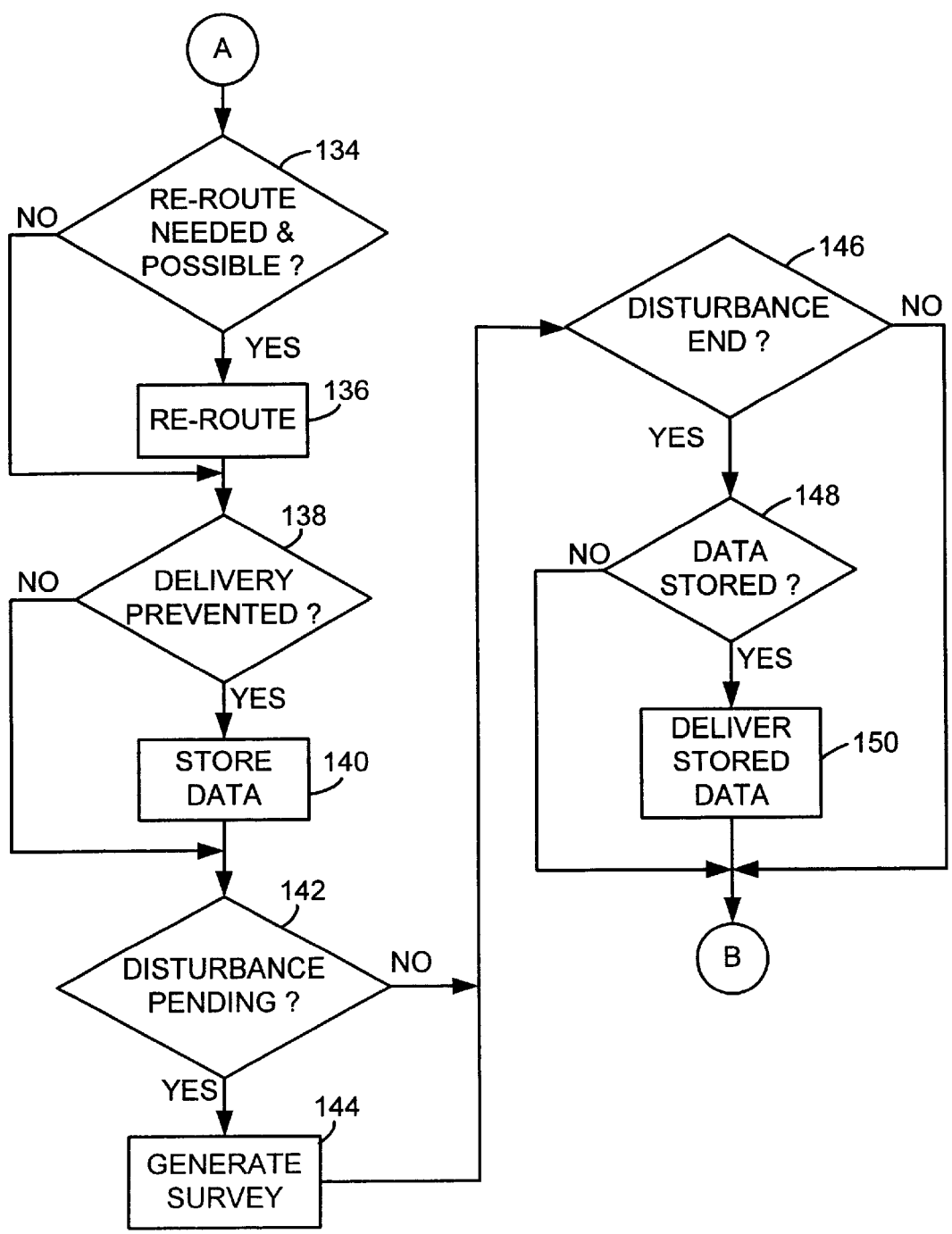

Turning to FIG. 4A, at startup, the network management system 38 first performs any required housekeeping routines (block 100). Such routines could include, for example, initializing variables, performing self-tests, virus checks, and/or other conventional maintenance routines. The network management system 38 then accesses the database 48 to load the default settings for the business model(s) serviced by the system (block 102). The default settings will typically be defined as the state wherein all elements of the network 1 are properly functioning (i.e., no disturbances are present).

The network management system then enters a loop where it waits for the occurrence of an event on the network 1 (block 104). An "event" in this sense means a disturbance (e.g., an overload, a failure, a failed attempt to deliver data, etc.) or the occurrence of a monitored condition (e.g., state of installed components, state of processing of running software applications, etc.).

Upon detection of a system event (block 104), control proceeds to block 134 (see FIG. 4B) where a determination is made as to whether the detected event constitutes the detection of a blocked or overloaded channel (block 134). If such a channel is detected, the network management system 38 will take steps to re-route communications to network components such as client computers 2 away from the blocked or overloaded channel (block 136). In the preferred embodiment, such re-routing is accomplished by changing the system address(es) of the effected component(s) such that the overloaded or blocked channel is avoided by communication messages associated with such component(s). However, persons of ordinary skill in the art will appreciate that other re-routing techniques can be utilized without departing from the scope or spirit of the invention.

In any event, at block 138, a determination is made as to whether the detected event constitutes a failure to deliver data to a locked or disturbed area of the network 1. If the detected event is such a failure, the data is stored in a database for subsequent delivery when the disturbance is removed (block 140). If the detected event is not a failure to deliver data to a disturbed area (block 138) control proceeds to block 142.

At block 142, the network management system 38 determines whether a disturbance is pending somewhere in the network 1. If one or more disturbances are pending, the network management system 38 develops a disturbance survey comprising a list of the pending disturbances sorted by weight (i.e., severity) to facilitate prioritization of error handling. The disturbance survey is preferably routed to a network administrator (block 144). The periodicity at which the survey is routed is preferably adjustable by the administrator (e.g., whenever a new disturbance occurs, every 10 minutes, etc.).

At block 146, the network management system 38 determines whether the detected event constitutes an end to a disturbance in the network 1 (e.g., a PC returning to usable status). If it does not constitute such an event, control proceeds to block 110 (FIG. 4A). Otherwise, control proceeds to block 148.

At block 148, the network management system 38 determines whether any previously undeliverable data has been stored (for example, via block 140). If so, and if the removal of the disturbance now permits delivery of the stored data, such stored data is automatically routed to its original target address on the network (block 150). Control then proceeds to block 110 (FIG. 4A).

At block 110, the network management system 38 determines whether the detected event constitutes a failure (e.g., PC-1 has failed). If the event is not a failure, the network management system 38 determines whether the detected event constitutes a severe disturbance (block 112). If the event is not classified as a severe disturbance, the network management system 38 determines whether the detected event is classified as a minor disturbance (block 114). If the detected event is not a minor disturbance, then the system 38 determines whether the event is classified as a monitored condition (block 116). If it is not a monitored condition, control returns to block 104 where the network management system 38 waits for detection of another event.

As will be appreciated by persons of ordinary skill in the art, the classification determinations made at blocks 110, 112, 114 and 116 are performed by comparing the detected event to a predefined list of possible events contained in the database 48. Of course, other classification techniques can be utilized without departing from the scope or spirit of the invention.

If a classification is made at any one of blocks 110, 112, 114 and 116, control proceeds to block 118. At block 118, the network management system 38 determines whether the classified event requires updating of the graphical representation of the network 1 (i.e., FIG. 2). Updating would not be necessary in instances where the detected event had previously been detected (i.e., repeated detection of the same event), or in instances where a monitored condition or event is not graphically represented but is instead recorded by some other means. If no update is required, control returns to block 104. Otherwise, control proceeds to block 120. At block 120, the effected icon(s) in the graphical representation of the network 1 are updated in accordance with the classification determination made at block 110, 112, 114 or 116.

At block 122, the network management system 38 begins the process of determining what, if any, additional network components are effected by the detected event. The network management system 38 makes this determination by sequentially comparing each network component which is directly or indirectly related to the original component associated with the detected event against a set of predefined rules stored in the database 48. The exact content of the rules is often at least partially dependent upon the network application. However, some, and sometimes all, of the rules will be universal. By way of an example of a universal rule, if a PC of a worker fails (e.g., PC-1 in FIG. 2), the associated worker is also considered as having entered the failed state (e.g., technical operator 1 in FIG. 2). By way of an example of an application specific rule, if a technical operator such as technical operator 1 in FIG. 2 fails, then the stock data project 32 will be severely impaired. A failure of technical operator 2 will not, however, have this same effect. In any event, the network management system loops through blocks 122–132 until every object associated, directly or indirectly, with the network component involved in the detected event has been examined to: (a) determine if it is effected by the event (block 122); (b) if an object is effected, to classify the effect as (1) a failure (block 124), (2) a severe disturbance (block 126), or (3) a minor disturbance (block 128); and (c) to reflect the effect in the visual representation of the network 1 in accordance with the classification made at block 124, 126 or 128 (block 130). After the last object which is directly or indirectly related to the network component associated with the detected event has been analyzed (block 132), control returns to block 104 where the network management system waits for, and/or proceeds with, the next detected event. Persons of ordinary skill in the art will appreciate that the classification performed at blocks 124–128 will preferably follow substantially the same classification procedures as described in connection with blocks 110–116. Persons of ordinary skill in the art will further appreciate that, although for simplicity of discussion, the above steps have been described as occurring in a particular order, other temporal arrangements, other steps, and/or other sequences of steps can be used without departing from the scope or spirit of the invention.

One significant advantage of the disclosed system is the enhanced ability to efficiently solve network problems it provides, especially as it relates to the failure of hardware and software components, (for example, bridges, star couplers, servers, software applications, etc.). As explained above, this enhanced ability is achieved by creating an overview as to which areas of a company are affected by a corresponding failure (for example, sales, development, production, etc.). The business processes corresponding to the particular business areas together with the installed hardware and software of the network (designated herein as "IP (Information Processing) resources") are modeled. As a result, the business processes including the corresponding IP resources, especially with regard to the effect of any disturbances of the IP resources, are made readily identifiable for the company. The network management system 38, for example, evaluates the failures of IP resources according to their effects on the business process and assigns priorities to the failures. With the aid of this priority, failures can be eliminated according to their importance.

The indicated network status (including the status of, for example, areas of the network affected by a system disturbance), thus gives a global overview about the instantaneous status of all hardware and software components in the network 1. This status makes it possible to react optimally to any disturbance in the network 1. However, in addition to any system errors, the utilization and the free system resources of each individual data processing equipment, as well as of the installed software components, are determined. The control unit 42 determines any limitations on the performance of the system 1 imposed by disturbances or failures of individual parts of the network 1, the areas of the network hierarchy affected by such disturbances or failures, and the corresponding business processes and projects effected, as a function of the found local network status. In addition, the control unit 46 preferably determines the possibility of starting and successfully processing applications and the possibility of processing applications that were still in the waiting loop at the time the disturbance occurred. Finally, through the output units 44, the network status is represented visually in the form of graphical icons reflecting possible limitations of the operation of process organization that was determined by the control unit 42. As a result, when a system disturbance occurs and when system bottlenecks occur as a result of overloading of individual components, their influence on other areas of the network hierarchy and, thus, on the models of the individual areas of the operational organization structure of the company hierarchy represented in the IP resources, can be determined and can be weighted according to their importance.

In the disclosed system and method, it is possible for every worker, especially every person with responsibility in the company, to quickly determine the instantaneous hardware and software status of the network 1 without any special technical understanding of the network 1. Moreover, such individuals can also recognize the influence of possible disturbances on the operational process organization. This means that information is available automatically to at least one user about the influence of any system disturbances on the operational process organization.

After restructuring most data processing installations in the company, preferably a system is used to convert the individual parts of the company structure into models for use by the system 38. These models provide an IP resource environment which corresponds essentially to the operational structure of the company or network 1 in question. Thus, for example, the individual workers of a department form a relatively closed workers'circle. Parallel to this, in the data processing installation, the individual computers or other end equipment of the workers are combined in a partial network, which is connected through a communication location (e.g., bridge 7) with the other operational network of data processing installations. Through the connecting point (which can be, for example, a bridge, a router or a repeater), all other workers are connected to the individual workers of the department or can have access to their database, while the department again communicates with the other network participants and has access to centrally or noncentrally determined data.

As will be appreciated by persons of ordinary skill in the art, in the disclosed system 38, even workers who are not very familiar with the network 1 can obtain information by viewing display equipment as to which parts of the company are excluded or otherwise inhibited from computer-technological teamwork because of disturbances or bottlenecks. For example, if the server of the Bookkeeping Department fails, a department head from a sales division can see directly on his/her screen that, at the present time, communication with bookkeeping is not possible, and, thus, billing of his contracts is not possible. However, at the same time, he recognizes that the Sales Department is not affected by this disturbance and that he can transfer the contracts for the purchase of the sold goods in an orderly manner in spite of the disturbance in the system. Especially, for workers in business management, a special advantage of the disclosed system arises from the fact that the display shows the unavailable or affected business processes over the entire company. Thus, with one simple look and independently of expert coworkers, the manager of a company can monitor as to what extent the data processing system is disturbed and the extent of the measures that must be taken.

Furthermore, the disclosed system 38 also provides information as to which individual parts of the network 1 are frequently overloaded and/or as to when such parts are approaching their system limits. Thus, for example, a server which is consistently marked as being overloaded on the screen of the manager, shows that the desire of a department for a more powerful equipment is actually based on consideration of facts. On the other hand, the investment in a more expensive additional connection to the production location abroad can be saved when the system shows that the bottlenecks are not due to the transmission, but rather to an overloaded gateway server which is arranged before the router and/or to the effects of overloading on the network 1.

Another advantage of the disclosed system 38 lies in the fact that, in the case of disturbances in the network 1, bypassing the disturbance can be made possible either manually by the system administrator or automatically by the network management system 38, or a bottleneck in the connecting line can be avoided by changing the individual system addresses so that the data addressed to the corresponding components can reach their intended goal through other parts of the network 1.

In a preferred embodiment of the invention, the influences of the network properties on the process organization is shown in the form of a small icon on the desktop of the particular user. The icon always shows the generalized business area and, when an error is reported, the user can request a detailed view of this business area by an input, (e.g., by a mouse click on this business area icon). Upon repeated use of this technique, if he/she is so authorized, the user can penetrate deeper and deeper into the organizational structure of the company until information about each individual cost station is obtained.

Expediently, the representation of the status of the business area is done by coloring the particular symbol. Thus, for example, the network management system 38 can subdivide the possible disturbances into four hierarchical steps, in which the color green stands for no disturbance, yellow for mild disturbance, orange for severe disturbance and red for total failure. However, persons of ordinary skill in the art will readily appreciate that other representation methodologies can be employed without departing from the scope or spirit of the invention.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. For use with a computer network having a hierarchical structure, the network including a server, a first client computer, and a second client computer, a network management system comprising:

a status detector for detecting an event on the network, the event effecting a condition of a first network element;

a control unit cooperating with the status detector for determining whether a condition of a first business project associated with the first network element is effected by the detected event; and a graphics driver cooperating with the status detector and the control unit to visually represent the status of at least a portion of the network on the first and second client computers, the status including the conditions of the first network element and the first business project as determined by the status detector and the control unit.

2. A network management system as defined in claim 1 wherein the detected event comprises a disturbance.

3. A network management system as defined in claim 1 wherein the detected event comprises a system property.

4. A network management system as defined in claim 1 wherein the control unit and the status detector identify limitations in the performing ability of the first network element and the first project and cooperate with the graphics driver to visually represent a status of the network which visually characterizes the conditions of the first network element and the first project with regard to the identified limitations.

5. A network management system as defined in claim 1 wherein the control unit determines a processing status of a software application on the network; and cooperates with the graphics driver to visually represent a status of the network which visually characterizes the network components with regard to the processing status of the software application.

6. A network management system as defined in claim 1 wherein the status detector determines a processing status of a software application on the network; and cooperates with the graphics driver to visually represent a status of the network which visually characterizes the network components with regard to the processing status of the software application.

7. A network management system as defined in claim 1 wherein the network management system is associated with a first sub-network and further comprising a second network management system associated with a second sub-network for determining a status of the second sub-network, and wherein the network management systems of the first and second sub-networks exchange status information to determine the network status for the network.

8. A network management system as defined in claim 7 wherein the first and second sub-networks are connected to one another by at least two routers.

9. A network management system as defined in claim 7 wherein the first and second sub-networks are connected to one another by at least two bridges.

10. A network management system as defined in claim 7 wherein the first and second sub-networks are connected to one another by a backbone.

11. A network management system as defined in claim 7 wherein the network management systems of the first and second sub-networks communicate with one another through telephone lines.

12. A network management system as defined in claim 1 wherein the network management system is responsive to a detected event indicative of a blocked or overloaded communication channel to change the system address of the first client computer such that the overloaded or blocked communication channel is avoided by communications with the first client computer.

13. A network management system as defined in claim 1 wherein the graphics driver visually represents the conditions of the first network element and the first project on a monitor connected to the server.

14. A network management system as defined in claim 13 wherein the control unit delivers a disturbance survey comprising a list of disturbances sorted by weight to at least one of the users of the network.

15. A network management system as defined in claim 1 further comprising an output device cooperating with the graphics driver to transmit the visual representation of the status of the network to substantially all display devices of the network.

16. A network management system as defined in claim 1 wherein the visual representation of the status of the network comprises a status line blended in the edge region of a desktop display.

17. A network management system as defined in claim 1 wherein the visual representation of the status of the network comprises a miniaturized representation of the network hierarchy, with any overloaded, disturbed and trouble-free areas of the network hierarchy being distinguished from one another with the aid of color coding.

18. A network management system as defined in claim 1 wherein the visual representation of the status of the network includes visual representations of client computers and network components in a first sub-network, and further includes visual representations of connections to a sub-network neighboring the first sub-network, wherein the network management system is responsive to an input to visually represent the status of the neighboring sub-network.

19. A network management system as defined in claim 1 wherein the visual representation of the status of the network includes weighting of the disturbances and bottlenecks detected by the control unit according to their effect on the operation of the network.

20. A network management system as defined in claim 1 wherein if the detected event prevents delivery of data to an address on the network, the network management system stores the data for later delivery.

21. A network management system as defined in claim 20 wherein the network management system automatically sends the stored data to the originally intended address when the delivery impediment has been removed.

22. A network management system as defined in claim 1 wherein, if the detected event comprises a disturbance of a first network element, the network management system isolates an area of the network associated with the first network element from the remainder of the network and includes the isolation in the visual representation of the status of the network.

23. A network management system as defined in claim 1 wherein the control unit cooperates with the status detector to determine whether a condition of a second network element associated with the first network element within the hierarchical structure is effected by the detected event.

24. A network management system as defined in claim 1 wherein the control unit cooperates with the status detector to determine whether a condition of a second project associated with the first network element within the hierarchical structure is effected by the detected event.

25. A network management system as defined in claim 1 wherein the control unit cooperates with the status detector to determine whether a condition of a second project associated with the first project within the hierarchical structure is effected by the detected event.

26. A network management system as defined in claim 1 wherein the first network element is a database, and the detected event is a bottleneck caused by too many devices seeking to access the database.

27. A network management system as defined in claim 1 wherein the detected event is an overload condition, and wherein frequent overload conditions of the first network event provides information for determining whether an upgrade of the first network element is cost justified.

28. For use with a computer network having a hierarchical structure, the network including a server, a first client computer, and a second client computer, a method comprising the steps of:
    detecting an event on the network, the event effecting a condition of a first network element;
    determining whether a condition of a first business project associated with the first network element is effected by the detected event; and
    visually representing the status of at least a portion of the network on the first and second client computers, the status including the conditions of the first network element and the first business project.

29. A method as defined in claim 28 further comprising the steps of:
    responsive to a disturbance, determining system conditions for each network element in a predefined area of the network;
    comparing the determined system conditions with the operational organizational structure of the network to identify the effects of the determined system conditions on individual operational processes associated with the operational organizational structure; and
    visually displaying the effects of the determined system conditions on individual areas of the network hierarchy associated with the operational processes.

30. A method as defined in claim 29 further comprising the step of displaying the operational organizational structure of the network.

31. A method as defined in claim 28 further comprising the step of determining whether a condition of a second network element associated with the first network element within the hierarchical structure is effected by the detected event.

32. A method as defined in claim 28 further comprising the step of determining whether a condition of a second project associated with the first network element within the hierarchical structure is effected by the detected event.

33. A method as defined in claim 28 further comprising the step of determining whether a condition of a second project associated with the first project within the hierarchical structure is effected by the detected event.

34. A method as defined in claim 28 wherein the first network element is a database, and the detected event is a bottleneck caused by too many devices seeking to access the database.

35. A method as defined in claim 28 wherein the detected event is an overload condition, and wherein frequent overload conditions of the first network event provides information for determining whether an upgrade of the first network element is cost justified.

36. For use with a computer network having a hierarchical structure, the network including a server, a first client computer, and a second client computer, a network management system comprising:
    a status detector for detecting an event on the network, the event effecting a condition of a first network element;
    a control unit cooperating with the status detector for determining whether a condition of a first project associated with the first network element is effected by the detected event; and
    a graphics driver cooperating with the status detector and the control unit to visually represent the status of at least a portion of the network on the first and second client computers, the status including the conditions of the first network element and the first project as determined by the status detector and the control unit.

37. A network management system as defined in claim 36 wherein the first network element is a database, and the detected event is a bottleneck caused by too many devices seeking to access the database.

38. A network management system as defined in claim 36 wherein the detected event is an overload condition, and wherein frequent overload conditions of the first network event provides information for determining whether an upgrade of the first network element is cost justified.

39. For use with a computer network having a hierarchical structure, the network including a server, a first client computer, and a second client computer, a method comprising the steps of:

detecting an event on the network, the event effecting a condition of a first network element;

determining whether a condition of a first project associated with the first network element is effected by the detected event; and visually representing the status of at least a portion of the network on the first and second client computers, the status including the conditions of the first network element and the first project.

* * * * *